Figure 1:
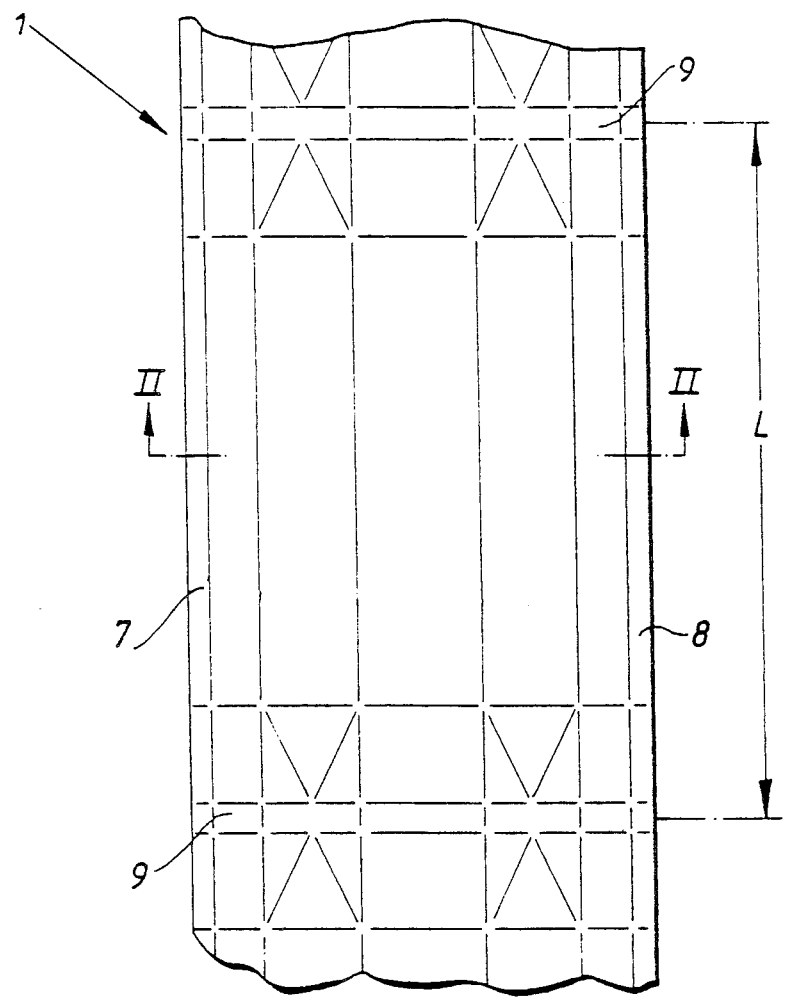

United States Patent [19]

Löfgren et al.

[11] Patent Number: 5,122,410
[45] Date of Patent: Jun. 16, 1992

[54] LAMINATED PACKING MATERIAL WITH GAS AND AROMA BARRIER PROPERTIES

[75] Inventors: Lars Löfgren, Staffanstorp; Peter Frisk, Malmö, both of Sweden

[73] Assignee: Tetra Pak Holdings S.A., Pully, Switzerland

[21] Appl. No.: 452,365

[22] Filed: Dec. 19, 1989

[30] Foreign Application Priority Data

Jan. 11, 1989 [SE] Sweden .................. 8900080

[51] Int. Cl.⁵ .................. B32B 13/12; B32B 27/06; B65D 65/40
[52] U.S. Cl. .................. 428/216; 428/451; 428/461; 428/498; 428/702; 428/480; 426/127; 156/90; 156/182
[58] Field of Search .............. 428/216, 451, 461, 498, 428/702, 480

[56] References Cited

U.S. PATENT DOCUMENTS 3,740,306  6/1973  Kosbab et al. .................. 428/461 X
3,813,315  5/1974  Valyi .................. 428/461 X
4,792,488 12/1988  Schirmer .................. 428/516 X Primary Examiner—P. C. Sluby
Attorney, Agent, or Firm—Burns, Doane, Swecker & Mathis

[57] ABSTRACT

A laminated material for the manufacture of packing containers with good gas and aroma barrier properties and or parts for such containers, and a method for the manufacture of the laminated material (1).

The laminated material (1) comprises a first partial laminate (1) comprising a carrier layer (2) of thermoplastics and a barrier layer (3) of inorganic material of 50–500 Å thickness serving as a gas and aroma barrier and a second partial laminate (1b) comprising a carrier layer (4) and a barrier layer (5) of inorganic material of 50–500 Å thickness serving as a gas and aroma barrier, these partial laminates being joined to one another by means of an intermediate layer (6) of bonding agent, their respective barrier layers facing inwards towards one another.

7 Claims, 3 Drawing Sheets

LAMINATED PACKING MATERIAL WITH GAS AND AROMA BARRIER PROPERTIES

The present invention relates to a laminated material for the manufacture of packing containers with good gas and aroma barrier properties and/or parts for such containers. The invention also relates to a method for the manufacture of the laminated material.

In packing technology so-called non-returnable or one-way packages have been used for a long time for liquid foodstuffs. A very large group of these packages is manufactured from a laminated material comprising a stiffness layer of paper or cardboard and outer and inner coatings of thermoplastics which on the one hand provide the package with the required liquid-tightness and on the other hand make it possible for the package to be made permanent in its desired geometric outer shape by means of so-called heat-sealing which is based on the surface-fusing of thermoplastic-coated regions of the material folded against one another by means of a supply of heat and pressure so as to form liquid-tight, mechanically strong sealing joints. This material, which is often used in packages for less oxygen gas sensitive foodstuffs, e.g. milk, lacks the necessary tightness properties towards gas and certain types of aroma substances and is less suitable, therefore, in packages intended for foodstuffs more sensitive to oxygen gas, e.g. juice, which also contains such readily penetrating and/or readily absorbed aroma substances. To furnish these packages with the required tightness characteristics towards light and the said aroma substances, the material is complemented, therefore, usually by an aluminium foil (Al foil) applied to the inside of the package which provides the package with these necessary gas and aroma barrier properties.

A serious problem in the case of the packing material described, which comprises an Al foil as a gas and aroma barrier, is that an Al foil because of its low extensibility easily bursts or cracks along particularly exposed regions or so-called crosses during the conversion of the material to packages, and the strains on the material within these regions may even be so strong that the thermoplastic coatings included in the material also rupture and seriously impair the tightness properties of the finished packages as a consequence.

It is also known to provide a packing material with a barrier layer of a polymer material e.g. ethylene-vinyl alcohol copolymer (EVOH), serving as a gas and aroma barrier, but known barrier layers of this type as a rule are moisture-sensitive and lose gas-tightness properties if they are exposed to moisture.

It is an object of the present invention, therefore, to provide directions regarding a new laminated material for the manufacture of packing containers with good gas and aroma barrier properties and/or parts for such containers, without, or with negligible, risk of ruptures and crack formation in the material during its conversion to packing containers.

It is a further object to provide a packing material free from moisture-sensitive gas and aroma barrier layers.

It is a further object to provide a laminated material for the manufacture of gas and aroma-tight packing containers with good dimensional stability without the use of a stiffness layer of paper or similar moisture-sensitive material.

These objects are achieved in accordance with the present invention in that a laminated material of the type described in the introduction has been given the characteristic that it comprises a first partial laminate comprising a carrier layer and a barrier layer of inorganic material with a layer thickness of 50–500 Å serving as a gas and aroma barrier, and a second partial laminate comprising a carrier layer and a barrier layer of inorganic material with a layer thickness of 50–500 Å serving as a gas and aroma barrier, and that the partial laminates are joined to one another by means of an intermediate layer of bonding agent, their respective barrier layers facing inwards towards one another.

It has been found that the inorganic material layers which, for example, may consist of an inorganic silicon compound, e.g. silicon dioxide ($SiO_2$) or silicon nitride ($Si_3N_4$), in spite of their small material thickness possess extraordinarily good gas and aroma barrier properties at the same time as, thanks to their small material thickness, they are sufficiently flexible and extensible to make possible a conversion of the material to packing containers and/or parts for containers without any risk of cracking or bursting even in the most exposed material regions. A further advantage which is obtained by the barrier layer of the preferred type mentioned here is that it is practically completely inert and therefore does not, or only to a negligible degree, affect, or is affected by, the particular contents in the finished package.

It is a further object of the present invention to provide a method for the manufacture of the laminated material.

This object is achieved in accordance with the invention either by the method which is described in the following claim 6 or by the method described in the following claim 7.

Figure 2:
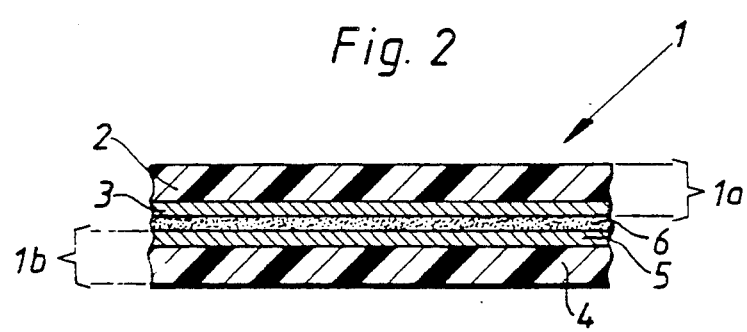
Figure 3:
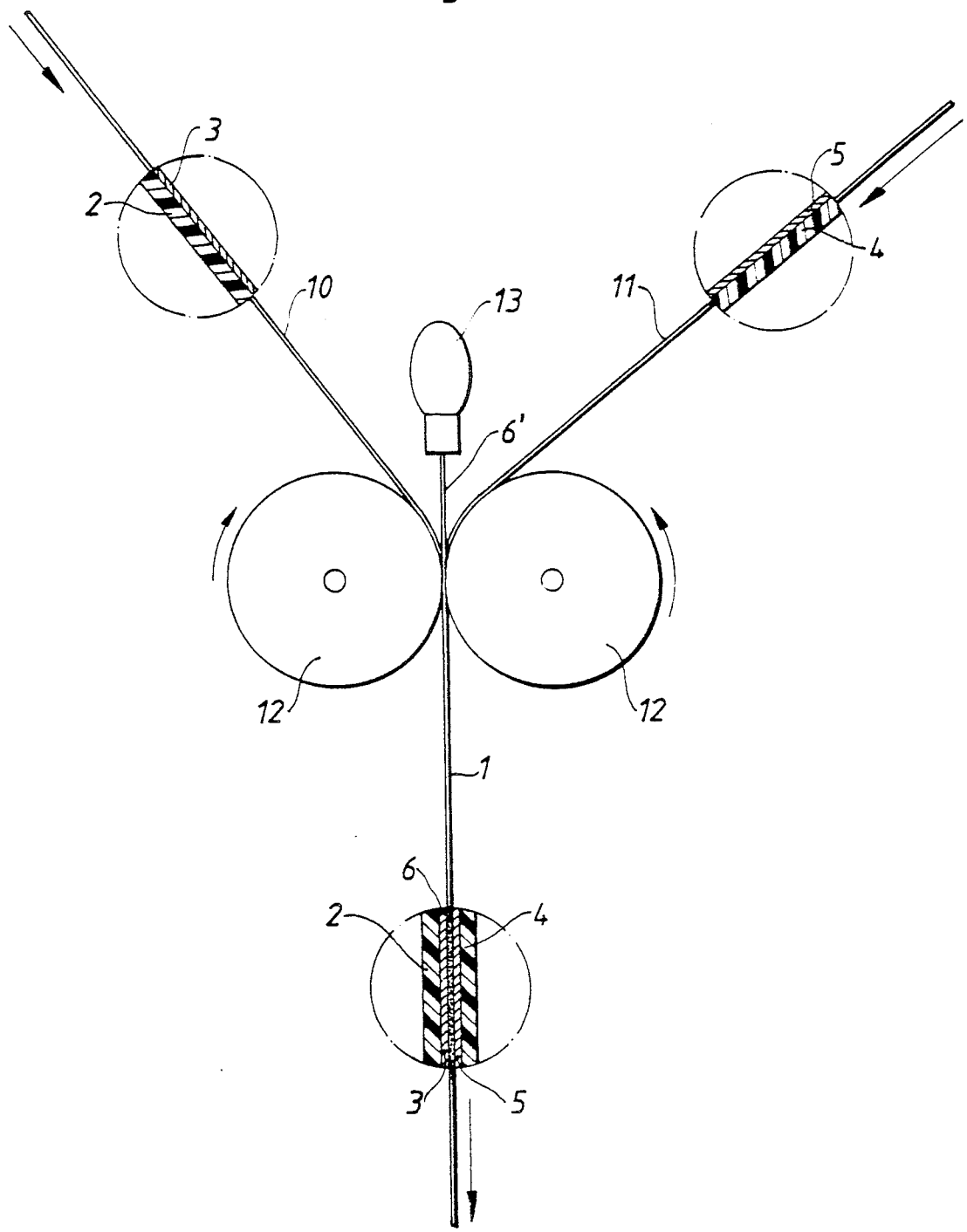
Figure 4:
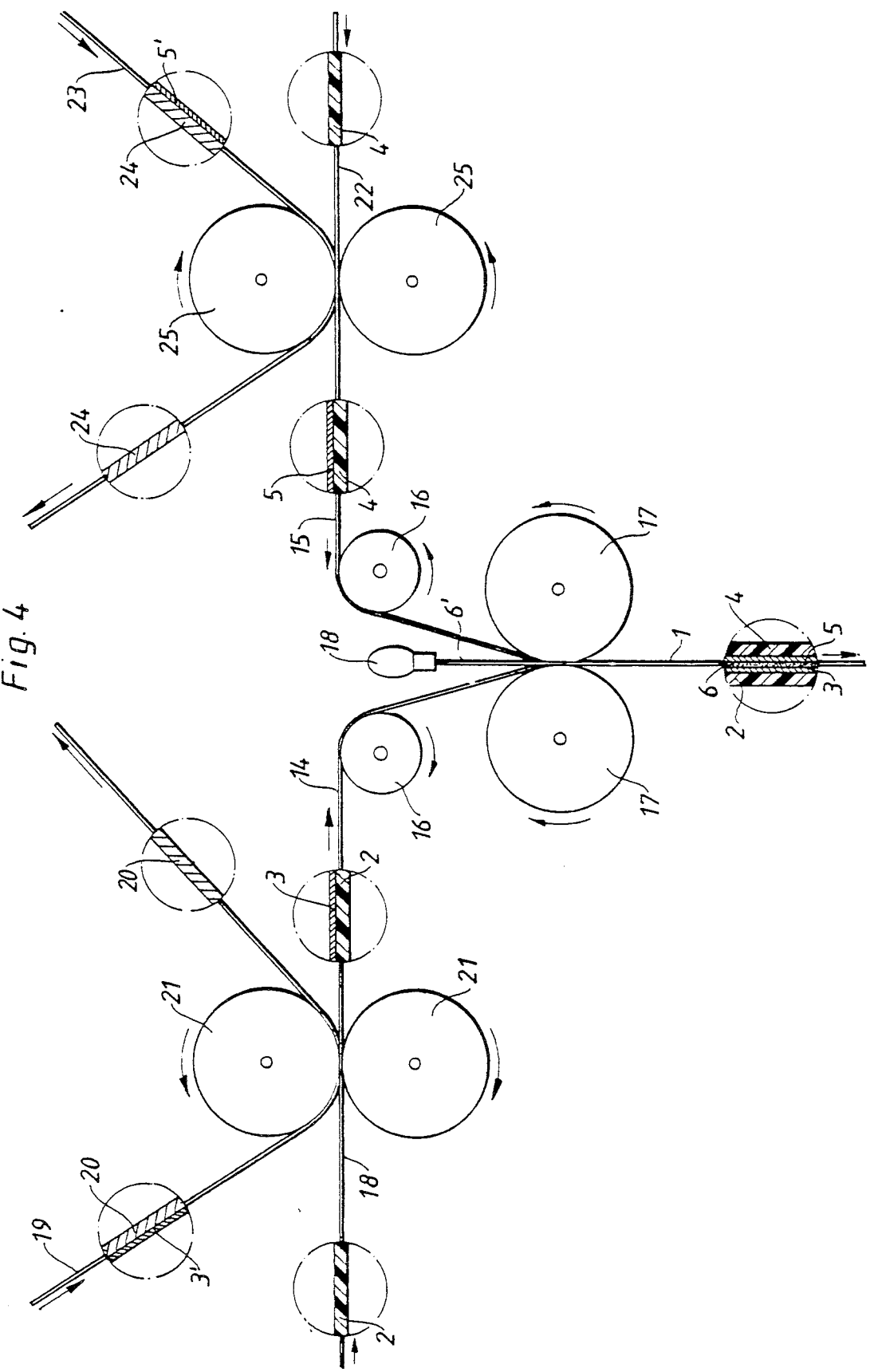

The invention will now be described in detail with special reference to the attached drawings, wherein FIG. 1 shows schematically a part of a laminated, weblike material in accordance with the invention, FIG. 2 is a cross-section along the line II—II in FIG. 1, FIG. 3 illustrates schematically a method for the manufacture of the laminated material in accordance with the invention, and FIG. 4 illustrates schematically a second method for the manufacture of the laminated material in accordance with the invention.

FIG. 1 thus shows schematically a portion corresponding to a whole package length L of a weblike, laminated material 1 in accordance with the invention for the manufacture of packing containers with good gas and aroma barrier properties. As is evident from FIG. 2 the material 1 consists of a first partial laminate 1a comprising a carrier layer 2 and a barrier layer 3 of inorganic material with tightness properties towards gas and aroma substances applied to the side of the carrier layer facing inwards, and a second partial laminate 1b comprising a carrier layer 4 and a barrier layer 5 of inorganic material with similarly good tightness properties towards gas and aroma substances applied to the side of the carrier layer 4 facing inwards. The two partial laminates 1a and 1b are joined to one another by means of an intermediate layer 6 of bonding agent with good adhesion to the mutually facing barrier layers 3 and 5, for example a conventional bonding agent of the Surlyn TM, or ionomer resin, ethylene acrylic acid copolymer. EAA etc. type.

The barrier layers 3 and 5 which may consist, for example, of silicon dioxide ($SiO_2$) or silicon nitride ($Si_3N_4$) are applied to their respective carrier layers 2 and 4 by vacuum deposition or by so-called hot stamp technique and have a material thickness of only 50–500, preferably 200 Å.

From the material 1 are manufactured packages with good gas and aroma barrier properties in accordance with conventional technique in that the two longitudinal edge zones 7 and 8 of the material first are combined with one another by means of so-called heat-sealing in an overlap joint so as to form a tube. The tube is filled with the particular contents and is divided into closed packing units by repeated flattening and transverse sealing along zones 9 at right angles to the longitudinal axis of the tube. Thereafter the packing units are separated from one another by means of cuts in the transverse sealing zones 9 and are given the desired final geometric shape, usually a parallelepiped, with the help of a further forming and sealing operation during which the double-walled, triangular corner lugs of the cushionlike packing units are folded in against, and are sealed to, the outside of the packages.

The manufacture of the packages in the known manner described above is facilitated in that the carrier layers 2 and 4 are constituted of thermoplastics, preferably polythene, which thus makes it possible to combine thermoplastic-coated material regions folded towards one another along longitudinal edge zones 7 and 8 and transverse sealing zones 9 respectively by so-called heat-sealing during which the mutually facing thermoplastic coatings with the help of a supply of heat and pressure are made to surface-fuse with one another so as to form liquid-tight, mechanically strong sealing joints. By choosing the carrier layers 2 and 4 of thermoplastic material a further advantage is obtained in that the material 1 is wholly free from, and for its mechanical rigidity and stability is independent of, relatively thick stiffness layers of paper or similar moisture-sensitive material which is often used in conventional packing material. As mentioned earlier, a packing material 1 in acordance with the invention can be manufactured by anyone of the methods illustrated schematically in FIG. 3 and FIG. 4.

In accordance with FIG. 3 the material 1 is manufactured from a first web 10 of prefabricated partial laminate 1a comprising a carrier layer 2 of thermoplastics and a barrier layer 3 of inorganic material of 50–500 Å thickness applied to one side of the carrier layer by vacuum deposition, and a second web 11 of prefabricated partial laminate 1b comprising a carrier layer 4 and a barrier layer 5 of inorganic material of 50–500 Å thickness applied to one side of the carrier layer by vacuum deposition. The two webs 10 and 11 (or partial laminates 1a and 1b respectively) are brought together with their respective barrier layers 3 and 5 facing inwards towards one another and are conducted through the nip between a pair of cooperating counterrotating cylinders 12, by means of which the webs are lastingly joined to one another with the help of a bonding agent 6' which at the same time is supplied between the converging webs with the help of an applicator 13 so as to form the finished laminated material 1.

In accordance with FIG. 4 the finished laminated material 1 in accordance with the invention is manufactured similarly from a first web 14 (corresponding to partial laminate 1a) comprising a carrier layer 2 and a barrier layer of inorganic material of 50–500 Å thickness applied to one side of the carrier layer and a second web 15 (corresponding to partial laminate 1b) comprising a carrier layer 4 of thermoplastic material and a barrier layer of inorganic material of 50–500 Å thickness applied to one side of the carrier layer. The two webs 14 and 15 are conducted via deflection rollers 16 jointly with their respective barrier layers facing towards one another through the nip between a pair of cooperating, counterrotating cylinders 17 with the help of which the webs are lastingly joined to one another by means of a bonding agent 6' which at the same time is supplied between the converging webs with the help of an applicator 18 so as to form the finished material 1. The method according to FIG. 4 is distinguished from the earlier method insofar as the manner in which the two partial laminates or webs 14 and 15 are manufactured is concerned and, in particular, the manner in which the respective carrier layers 2 and 4 included in the partial laminates or webs are provided with their respective barrier layers 3 and 5. According to FIG. 4 the first web 14 is manufactured so that a web 18 of the thermoplastic carrier layer 2 (as shown on the left in FIG. 4) is brought together with a web 19 comprising a polymer carrier 20 (e.g. polyester) which on its side facing towards the web 18 supports a layer 3' of the inorganic material of 50–500 Å applied by vacuum deposition. The webs 18 and 19 are conducted jointly through the nip between a pair of cooperating cylinders 21 which according to conventional so-called hot stamp technique transfer and deposit the inorganic layer 3' on the weblike carrier layer 2 to form the first partial laminate or web 14, whilst the polymer carrier 20 freed from the barrier layer 3' is carried away for renewed vacuum deposition and repeated transfer of inorganic material. The other web 15 (corresponding to partial laminate 1b) is manufactured similarly (as shown on the right in FIG. 4) in that a web 22 of the carrier layer 4 is brought together with a web 23 comprising a polymer carrier 24 which on its side facing towards the web 22 has a layer 5' of inorganic material of 50–500 Å deposited by vacuum deposition. The two webs 22 and 23 are conducted jointly through the nip between a pair of heated cooperating cylinders 25 which in accordance with conventional so-called hot stamp technique transfer and deposit the layer 5' on the web 22 so as to form the second partial laminate. The polymer carrier 24 freed from the layer 5' likewise is carried away for renewed vacuum deposition and repeated transfer of inorganic material.

To facilitate the transfer of the respective layer 3' and 5' it may be appropriate, or even necessary, in some cases to perform some kind of surface treatment of the webs 18 and 22, e.g. application of a bonding agent of the surlyn, EAA, etc. type which also contributes to an increase in adhesion between the layers 3' and 5' and the respective webs 18 and 22.

A laminated material in accordance with the invention can also be used for the manufacture of package parts, e.g. so-called pull-tabs and sealing strips for application to the inside of packing containers, which is particularly desirable in those cases where the package is fabricated mainly from a packing material of conventional type comprising a carrier layer of paper or cardboard which along the longitudinal overlap joint formed during the tube formation has an absorbent cut edge freely exposed towards the inside of the package and which has to be sealed and protected.

We claim:

1. A laminated material comprising:

a first partial laminate comprising a thermoplastic carrier layer and a barrier layer consisting of a silicon compound;

a second partial laminate comprising a thermoplastic carrier layer and a barrier layer consisting of a silicon compound; and an intermediate layer of bonding agent joining the first and second partial laminates with their respective barrier layers facing the intermediate layer.

2. The laminated material according to claim 1 wherein the barrier layers of inorganic material have a layer thickness of 50-500 Å.

3. The laminated material according to claim 1 wherein the silicon compound is silicon dioxide or silicon nitride.

4. The laminated material according to claim 1 wherein the thermoplastic carrier is polyethylene.

5. The laminated material according to claim 1 wherein the barrier layers are applied to the respective thermoplastic carrier layers by means of vacuum deposition.

6. The laminated material according to claim 1 wherein the barrier layers are applied to the respective thermoplastic carrier layers by means of a hot stamp technique.

7. The laminated material according to claim 1 wherein the bonding agent is an ionomer resin or an ethylene acrylic acid copolymer.

* * * * *